United States Patent [19]
Kiriyama

[11] Patent Number: 5,579,303
[45] Date of Patent: Nov. 26, 1996

[54] DATA TRANSMISSION APPARATUS

[75] Inventor: Takashi Kiriyama, Tokyo, Japan

[73] Assignee: NEC Corporation, Japan

[21] Appl. No.: 535,534

[22] Filed: Sep. 28, 1995

[30] Foreign Application Priority Data

Sep. 28, 1994 [JP] Japan .................................. 6-232723

[51] Int. Cl.$^6$ ........................................................ H04J 3/14
[52] U.S. Cl. .............................. 370/17; 370/94.2; 370/79; 371/41
[58] Field of Search ................................ 370/13, 17, 79, 370/60.1, 94.2, 108; 371/41

[56] References Cited

U.S. PATENT DOCUMENTS

| | | | |
|---|---|---|---|
| 5,379,305 | 1/1995 | Weng | 371/41 |
| 5,400,329 | 3/1995 | Tokura et al. | 370/79 |
| 5,490,168 | 2/1996 | Phillips et al. | 370/79 |
| 5,513,191 | 4/1996 | Takechi et al. | 370/13 |

FOREIGN PATENT DOCUMENTS

4-129351  4/1992  Japan .

*Primary Examiner*—Douglas W. Olms
*Assistant Examiner*—Min Jung

[57] ABSTRACT

In a data transmission apparatus, a data coding section codes input data and outputs the coded data. A error correction execution determining section determines execution/non-execution of error-correcting coding on the basis of a congestion state and a bit error generation state in a network, and generates determination information. A frame formation section multiplexes the determination information with the coded data in units of frames, and generates frame data having a predetermined frame format. A error-correcting coding section executes error-correcting coding for the coded data in units of frames in accordance with the determination information contained in the frame data, and generates frame length information representing a frame length of a frame for which error-correcting coding is executed. When the determination information contained in the frame data represents non-execution of error-correcting coding, a variable delay circuit delays the frame data of the frame, for which error-correcting coding is not executed, by a frame length indicated by frame length information of an immediately preceding frame for which error-correcting coding is to be executed. A selector outputs data from the data coding section and the variable delay circuit in a time-serial manner.

8 Claims, 6 Drawing Sheets

FIG. 7A INPUT VIDEO SIGNAL

FIG. 7B COMPRESSED/CODED VIDEO SIGNAL

FIG. 7C VIDEO SIGNAL CELL

1 CELL    DUMMY DATA

FIG. 8

DATA TRANSMISSION APPARATUS

BACKGROUND OF THE INVENTION

The present invention relates to a data transmission apparatus and, more particularly, to a data transmission apparatus in an ATM (Asynchronous Transfer Mode) communication system using a B-ISDN (Broadband Integrated Service Digital Network).

Figure 6:
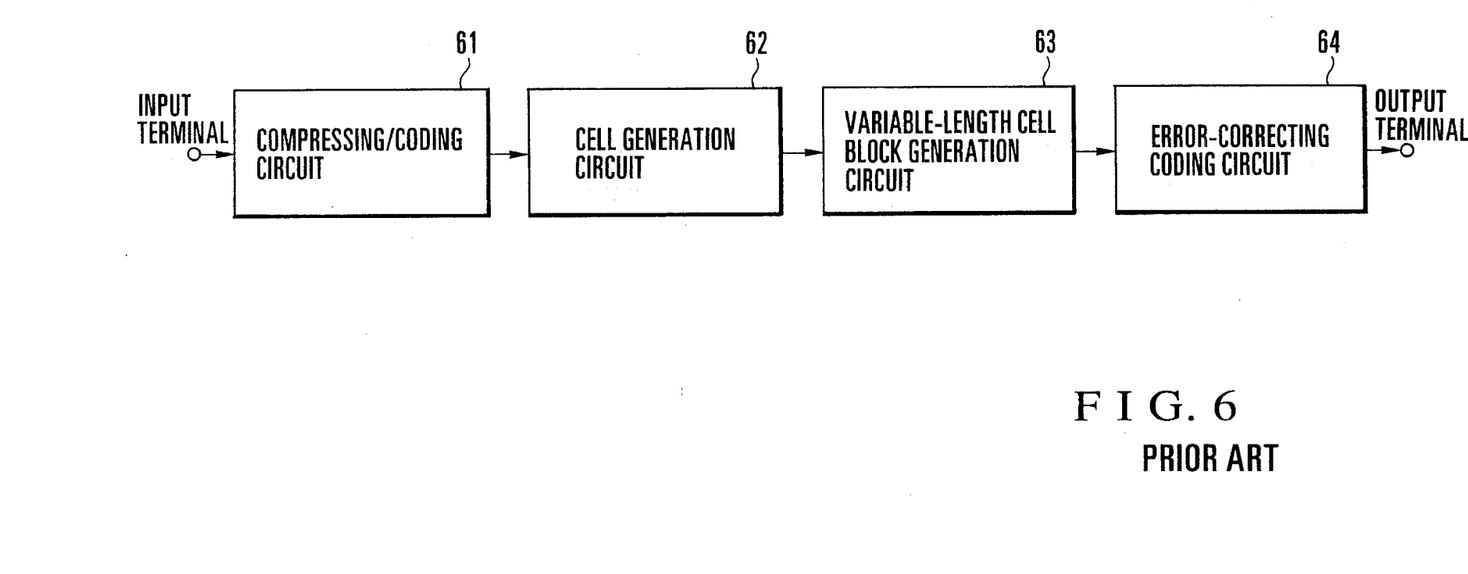
FIG. 6 is a block diagram showing a conventional data transmission apparatus.

FIG. 6 shows an arrangement of a conventional data transmission apparatus of this type. This apparatus is disclosed in Japanese Patent Laid-Open No. 4-129351. Referring to FIG. 6, an input video signal supplied to the input terminal is input to a compressing/coding circuit 61 to be coded. In coding, the compressing/coding circuit 61 uses, for example, an entropy coding scheme, in which the compressing/coding rate varies with time.

Figure 7A:
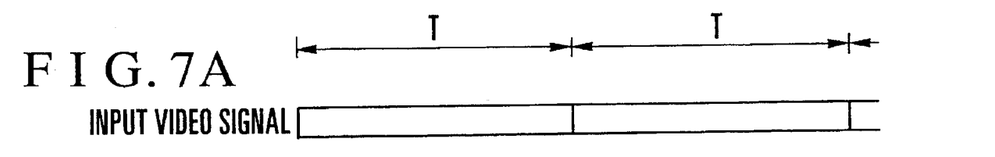
FIGS. 7A to 7C are timing charts for explaining the operation of a cell generation circuit in FIG. 6.
Figure 7B:
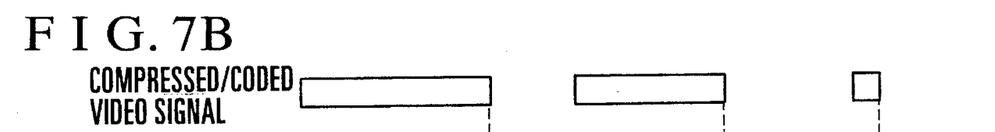
Figure 7C:
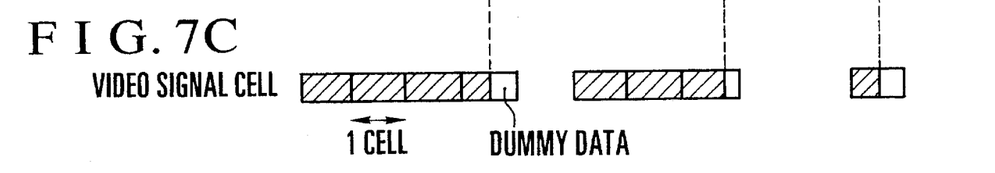

The compressed/coded data with a variable rate, which is output from the compressing/coding circuit 61, is input to a cell generation circuit 62. In the cell generation circuit 62, cells are generated in units of pixel blocks, each consisting of a predetermined number of pixels. More specifically, the cell generation circuit 62 generates one or a plurality of cells as shown in FIG. 7C with respect to the compressed/coded data in FIG. 7B, which is obtained by compressing/coding the input video signal having a predetermined interval T as shown in FIG. 7A, i.e., a signal obtained by compressing/coding a pixel block consisting a predetermined number of pixels.

In executing such cell generation, since the data amount of the coded output of a given pixel block does not always coincide with an integer multiple of a cell, a remainder portion may be produced. So-called dummy data such as all "0"s is inserted in this remainder portion (see FIG. 7C). As described above, one or a plurality (an integer) of cells are generated for each pixel block and input to a variable-length cell block generation circuit 63.

The variable-length cell block generation circuit 63 generates variable-length cell blocks. Referring to FIG. 6, the cells generated by the cell generation circuit 62 from the video signal having the predetermined interval T as described FIGS. 7A to 7C are formed into a cell block. That is, one or a plurality of cells obtained in units of pixel blocks are formed into a cell block.

Figure 8:
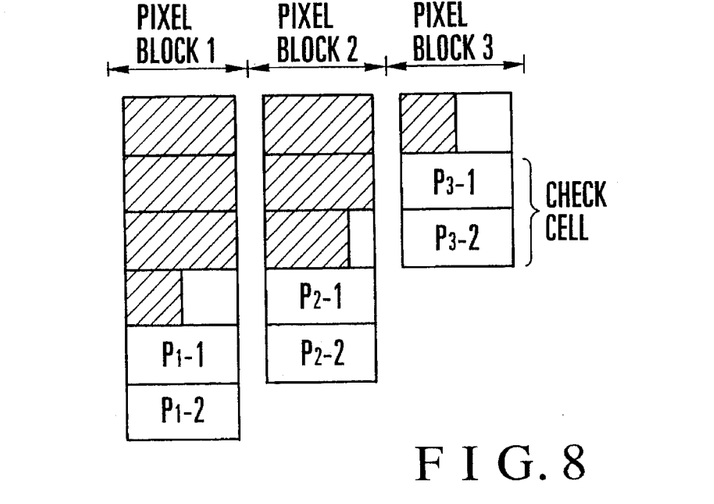
FIG. 8 is a view for explaining the operation of a variable-length cell block generation circuit in FIG. 6.

The variable-length cell block output obtained by the variable-length cell block generation circuit 63 is input to an error-correcting coding circuit 64 to be coded. Since each input to the error-correcting coding circuit 64 is a variable-length cell block, outputs like those shown in FIG. 8 are obtained. Referring to FIG. 8, reference symbols P1-1 to P3-2 denote check cells. In this case, two check cells are added to each cell block.

As described above, in order to perform error-correcting coding of a variable-length cell block, a fixed-length cell block having a sufficient length is assumed, and a portion corresponding to the difference between the fixed-length cell block and the actual variable-length cell block is assumed to be a cell (dummy cell) consisting of all-"0" data. In this manner, error correction is performed while the transmission delay is minimized, thereby allowing data transmission.

According to an ATM network in a B-ISDN, the transmission section of a transmission apparatus can recognize the error rate and the congestion state in the network on the basis of network management information represented by information obtained by an OAM (Operation Administration and Maintenance) function specified by the ITU recommendation I. 610 and the like.

In such a case, the transmission section can execute optimal control, depending on the state of the network, in accordance with the contents of data to be transmitted and the service form using the data. For example, when almost no congestion is recognized, data is transmitted without performing error-correcting coding to reduce redundant bits and transmission delay which occur in the process of error-correcting coding, thereby increasing the transmission efficiency or rate. In contrast to this, when the degree of congestion or the error rate increases, only error-correcting coding for bit errors is performed or strong error-correcting coding capable of coping with a cell loss is performed at the expense of the transmission efficiency depending on the degree of the congestion and the error rate.

In consideration of the above data transmission scheme, according to the conventional technique shown in FIG. 6, since error-correcting coding is always and permanently performed without recognizing the state of a network, optimal control cannot be performed by matching the transmission efficiency and rate with the state of the network.

SUMMARY OF THE INVENTION

It is an object of the present invention to provide a data transmission apparatus which can optimally control the transmission efficiency and rate by controlling the execution of error-correcting coding in accordance with the state of a network.

In order to achieve the above object, according to the present invention, there is provided a data transmission apparatus comprising data coding means for coding input data and outputting the coded data, determination means for determining execution/non-execution of error-correcting coding processing on the basis of a congestion state and a bit error generation state in a network in which data transmission is to be performed, and generating determination information representing the determination result, frame formation means for multiplexing the determination information from the determination means with the coded data from the data coding means in units of frames, and generating frame data having a predetermined frame format, error-correcting coding means for executing error-correcting coding processing for the coded data in units of frames in accordance with the determination information contained in the frame data from the frame formation means, and generating frame length information representing a frame length of a frame for which error correcting coding processing is executed, variable delay means for, when the determination information contained in the frame data from the frame formation means represents non-execution of error-correcting coding processing, delaying the frame data of the frame, for which error-correcting coding processing is not executed, by a frame length indicated by frame length information of an immediately preceding frame for which error-correcting coding processing is to be executed, and output means for outputting outputs from the error-correcting coding means and the variable delay means in a time-serial manner.

In an ATM network in a B-ISDN, cell loss occurs depending on a congestion state in the network. If, however, serial numbers are respectively to the respective cells on the transmission side, the presence/absence of an omission of information caused by the cell loss can be recognized by observing an omission of a serial number on the reception side. In order to restore the omission of information corresponding to one cell by error correction, strong error-correcting coding must be performed. The number of redundant bits increases and the processing time prolongs accordingly, resulting in decreases in transmission efficiency and rate.

Under the circumstances, the present invention is designed to select/determine whether to perform strong error-correcting coding, perform simple bit error correction or the like, or transmit data without performing error-correcting coding, depending on whether a congestion state is present in a network.

DESCRIPTION OF THE PREFERRED EMBODIMENT

An embodiment of the present invention will be described below with reference to the accompanying drawings.

Figure 1:
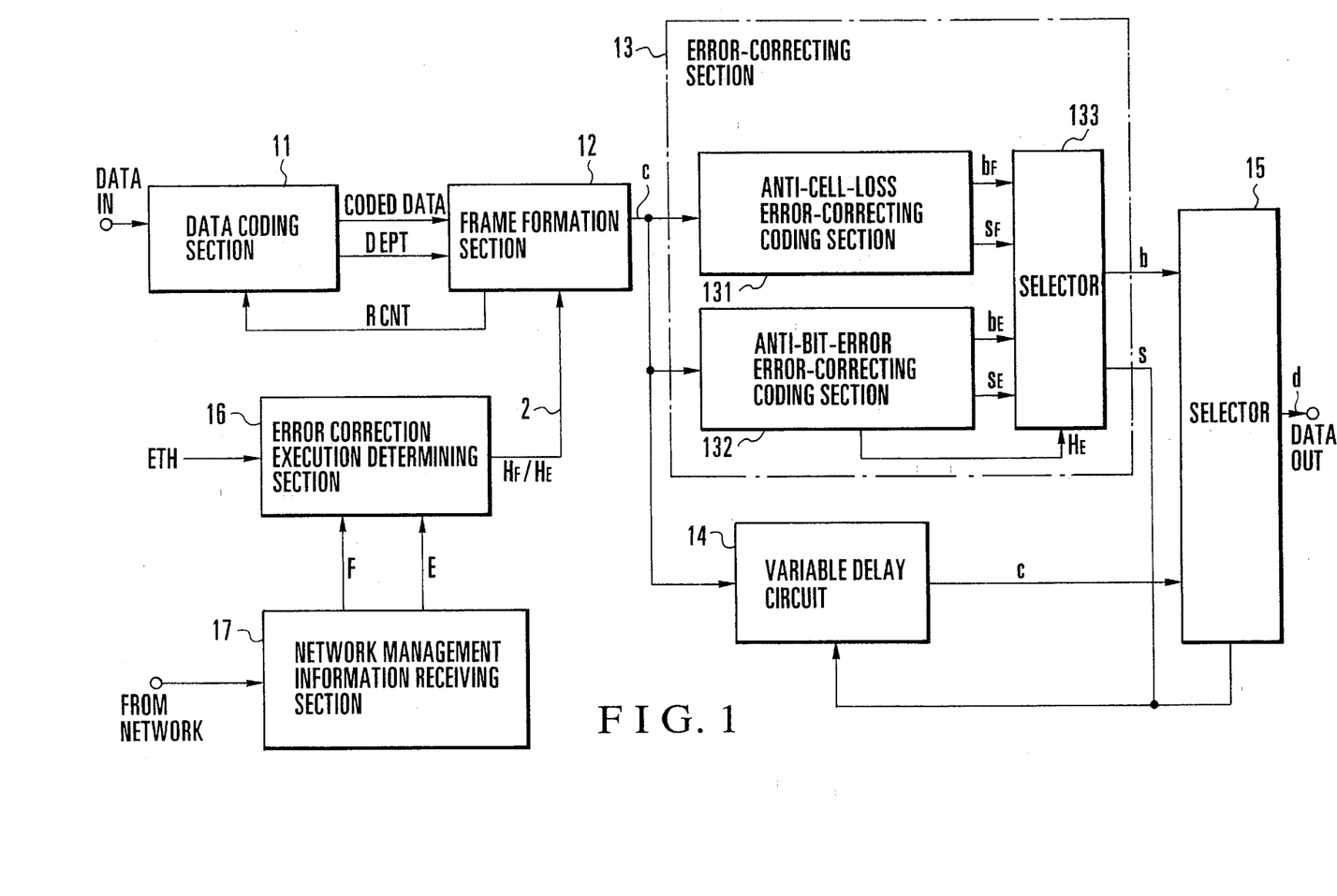
FIG. 1 is a block diagram showing a data transmission apparatus according to an embodiment of the present invention.

FIG. 1 shows a system according to an embodiment of the present invention, and more specifically, the transmission section of a data transmission apparatus. Referring to FIG. 1, input data is coded by a data coding section 11 and output as coded data in response to a read request signal RCNT output from a frame formation section 12. This output data is basically output in such a manner that a predetermined amount of data is output in a unit time T. FIGS. 2A to 2D show an operation in this data output form. In this case, each of times T1 to T6 corresponds to the unit time T.

Figure 2A:
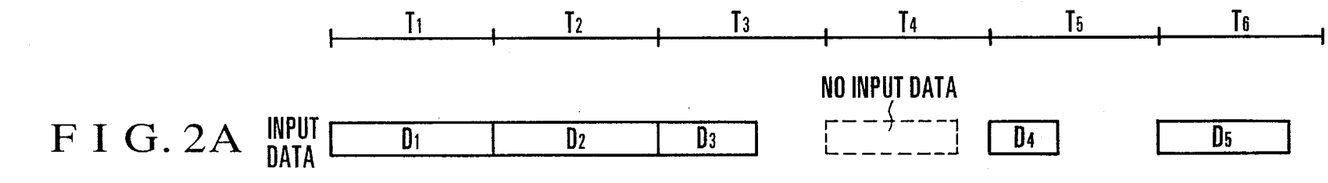
FIGS. 2A to 2D are timing charts for explaining the operations of a data coding section and a frame formation section in FIG. 1.
Figure 2B:
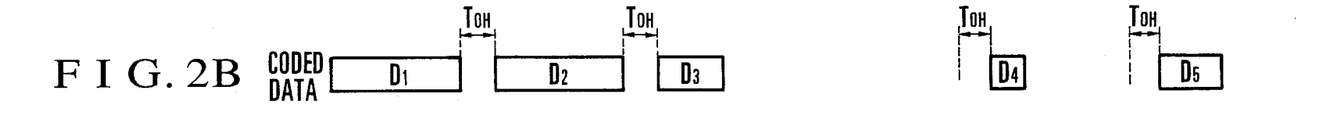
Figure 2C:
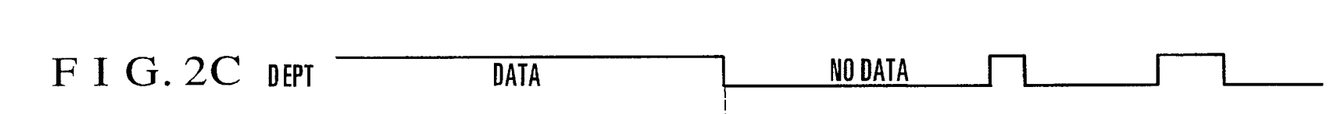
Figure 2D:
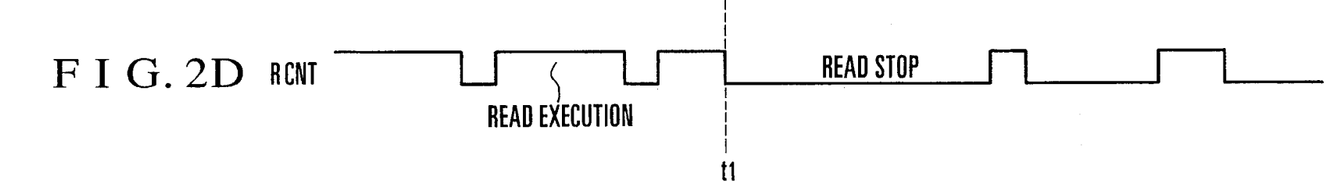

When, however, the input bit rate of data changes with time, or a compressing/coding scheme represented by an entropy coding scheme is used as a coding scheme, the compression ratio changes depending on the input data in FIG. 2A at the corresponding time. For this reason, the output bit rate of coded data to be output changes with the unit time T, as shown in FIG. 2B. Therefore, control is performed to stop the read request signal RCNT (FIG. 2D) output from the frame formation section 12 on the basis of a signal DEPT (FIG. 2C) indicating that there is no coded data to be output and read out from the data coding section 11, and stop the read operation when no coded data is present (see the intervals T3 to T6; assume that in FIG. 2C, the signal DEPT is set at "L" when there is no data to be read).

Each interval TOH in FIG. 2B is a time slot for inserting overhead information (a frame header and the like) when frame formation is performed by the frame formation section 12. Even when the highest input data rate is set as in the case of data D1 and D2 in the intervals T1 and T2 in FIG. 2B, time slots are required. This operation can be realized by using the above compressing/coding scheme in the data coding section 11 or setting the read bit rate for coded data to be higher than the data input bit rate.

Meanwhile, a network management information receiving section 17 on the network side receives network management information obtained by the operation administration and maintenance (OAM) function in the ATM network constituting the B-ISDN. Information F representing the presence/absence of congestion in the network at present and information E representing a bit error (the rate of occurrence of bit errors) are generated from the received management information.

An error correction execution determining section 16 generates a determination signal h consisting of determination information HF/HE representing execution/non-execution of error correction on the basis of the congestion information F and the bit error rate information E from the network management information receiving section 17.

More specifically, if congestion is present in the network, since cell loss may occur, the error correction execution determining section 16 generates "H"-level determination information HF representing that strong anti-cell-loss error-correcting coding is to be performed without fail. If no congestion is present in the network, since anti-cell-loss error-correcting coding need not be performed, the section 16 generates "L"-level determination information HF.

Assume that no congestion is present in the network. In this case, if the bit error rate in the network is equal to or higher than a reference value ETH, the error correction execution determining section 16 generates "H"-level determination information HE representing that anti-bit-error error-correcting coding is to be performed. If the bit error rate is lower than the reference value ETH, the section 16 generates "L"-level determination information HE because anti-bit-error error-correcting coding need not be performed. Note that even if the determination information HE is set at "H" level, the "H"-level determination information HF preferentially designates the execution of strong anti-cell-loss error-correcting coding as long as congestion is present.

Note that the reference value ETH can be properly changed in accordance with the contents of data to be transmitted and the service form using the data.

The frame formation section 12 multiplexes the coded data read from the data coding section 11 and the pieces of determination information HF and HE output from the error correction execution determining section 16 according to a predetermined frame format. In this case, a frame header (unique word) and the pieces of determination information HF and HE, and, if error-correcting coding is to be further performed, redundant bits are multiplexed into the time slot TOH in FIG. 2B, of the frame format, which is used to insert overhead information.

Figure 3:
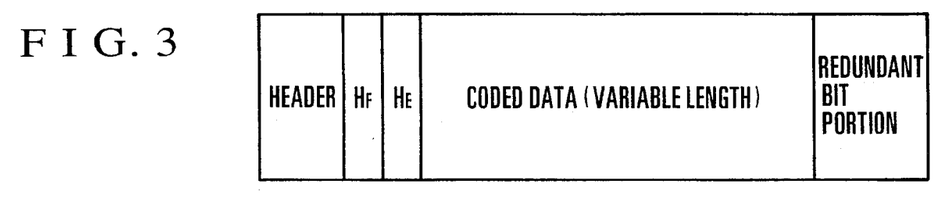
FIG. 3 is a view showing a frame format.

FIG. 3 shows a frame format. FIGS. 4A to 4F show the states of coded data output a having undergone frame formation and the determination signal h (HE, HE) (the signal h in FIG. 4B is set at "H" level when error correction is to be performed, and at "L" level when error correction is not performed). Referring to FIGS. 4A to 4F, the signals a, h, b, s, c and d respectively correspond to the signals denoted by the same reference symbols in FIG. 1. For the sake of descriptive convenience, a unit time Tn (n=1 to 9) is defined as the maximum period of time required to perform error-correcting coding. Reference symbol H denotes the header, i.e., "HF" and "HE" in FIG. 3; and R, the redundant bit portion.

Figure 4A:
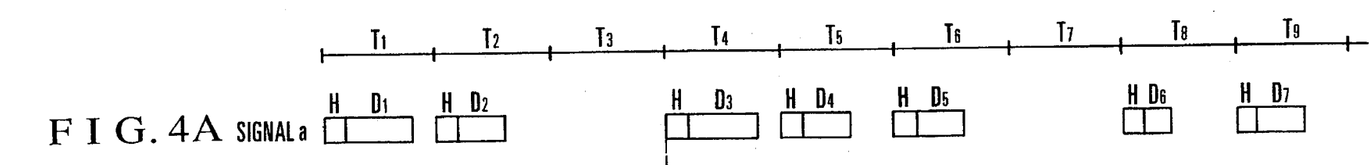
FIGS. 4A to 4F are timing charts showing the operation of the data transmission apparatus in FIG. 1.
Figure 4B:
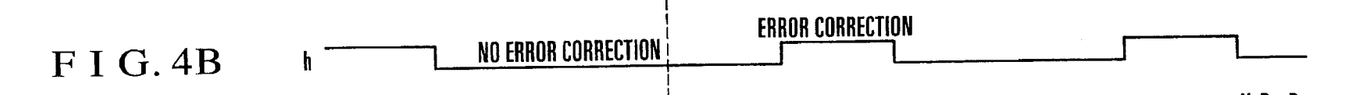

The coded data a having undergone frame formation (to be referred to as frame data hereinafter), shown in FIG. 4A, is input to an error-correcting coding section 13 and a variable delay circuit 14 in FIG. 1.

The error-correcting coding section 13 is constituted by an anti-cell-loss error-correcting coding section 131, an anti-bit-error error-correcting coding section 132, and a selector 133 for selectively supplying outputs from the coding sections 131 and 132.

The anti-cell-loss error-correcting coding section 131 performs strong error-correcting coding processing capable of restoring a cell loss to obtain a coded output bF, and generates/outputs a frame length signal sF representing the frame length after coding.

The anti-bit-error error-correcting coding section 132 performs error-correcting coding processing for detection correction of bit errors to obtain a coded output bE, and generates/outputs a frame length signal sE representing the frame length after coding.

The selector 133 alternatively supplies the coded outputs bF and bE and the frame length signals sF and sE from the two error-correcting coding sections 131 and 132. In this case, the selection state of the selector 133 is controlled on the basis of the determination bit HE in the frame which is detected by the anti-bit-error error-correcting coding section 132. However, the determination bit HF may be used instead. As is apparent, alternatively, the determination bit HF in the frame which is detected by the anti-cell-loss error-correcting coding section 131 may be used, or the determination bit HE may be used.

The pieces of determination information HF and HE multiplexed into the frame data input to the error-correcting coding section 13 are respectively detected, and anti-bit-error or anti-cell-loss error-correcting coding is performed for only the frame data a containing data D1, D4, and D6 in FIG. 4A which are to be subjected to error-correcting coding. As an error-correcting coding method to be used in this case, a method based on a combination of RS (128, 124) Reed-Solomon codes specified by the ITU recommendation I. 363 and an interleaving scheme may be used.

Note that coded data contained in each frame is variable-length data. In performing error-correcting coding based on Reed-Solomon codes for such variable-length data, a fixed-length data having a necessary length is assumed, and a portion corresponding to the difference between the fixed-length data and the actual variable-length data is assumed to be all-"0" data.

The error-correcting coding section 13 also outputs the frame length signal s representing the effective interval of frame data output from the error-correcting coding section 13. This frame data includes a check redundant bit calculated by error-correcting coding.

Figure 4C:
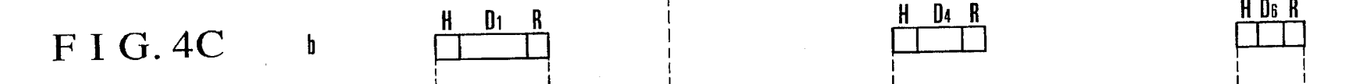
Figure 4D:
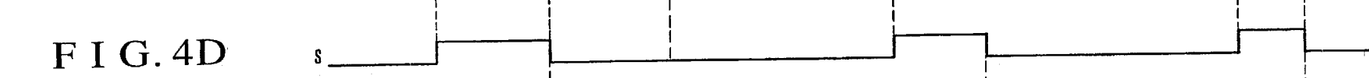

FIG. 4C shows the output frame data b having undergone error-correcting coding. FIG. 4D shows the frame length signal s representing the effective frame data interval (in FIG. 4D, when the signal s is set at "H" level, the signal indicates the effective frame data).

Meanwhile, the pieces of multiplexed determination information HF and HE (signal h) in FIG. 4B are detected from the frame data input to the variable delay circuit 14. The variable delay circuit 14 then executes variable delay processing for only the frame data a containing the data D2, D3, D5, and D7 in FIG. 4A for which error-correcting coding is not executed.

Figure 4E:
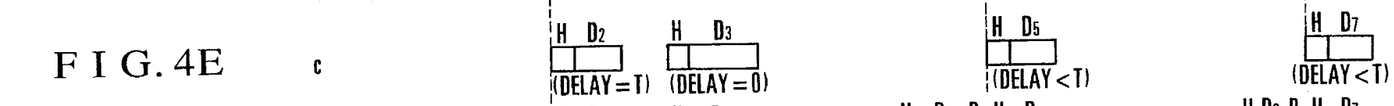
Figure 4F:
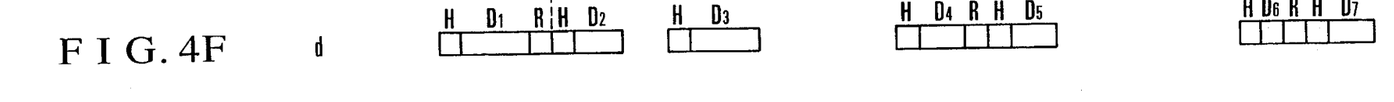

Variable delay control is performed by the following method. Assume that it is determined that error-correcting coding is to be executed for the frame data immediately preceding the frame data containing the data D2 in FIG. 4A, i.e., the frame data containing the data D1. In this case, with regard to the frame data containing the data D2, error-correcting coding is completed by the error-correcting coding section 13 on the basis of the frame length signal s representing the effective frame data interval, and the variable delay circuit 14 starts outputting the input frame data at the same time the frame data b in FIG. 4C is completely output. FIG. 4E shows the frame data c which is output with a delay.

Of the frame data containing the data D1 and D2 in FIG. 4A, the data D1 has the maximum data length. For this reason, the variable delay amount of the frame data containing the data D2 is the maximum delay T of error-correcting coding, as defined above. If, however, an interval in which no coded data is present continues before a given frame like the frame data containing the data D3, or frames for which no error-correcting coding is performed consecutively appear, the delay amount becomes 0 (the delay circuit is set in a through state).

Consider the frame data containing the data D4 and D5. If the data length of the frame data containing the data D4 for which error correction is to be executed is smaller than the maximum length, the interval of an output from the error-correcting coding section 13 becomes shorter than the maximum delay T defined above.

As described above, the variable delay circuit 14 outputs the frame data c containing the data D5, on the basis of the output signal s from the error-correcting coding section 13, and at the same time the frame data containing the data D4 is completely output from the error-correcting coding section 13. In this case, the variable delay is shorter than the maximum delay T (FIG. 4E).

Figure 5:
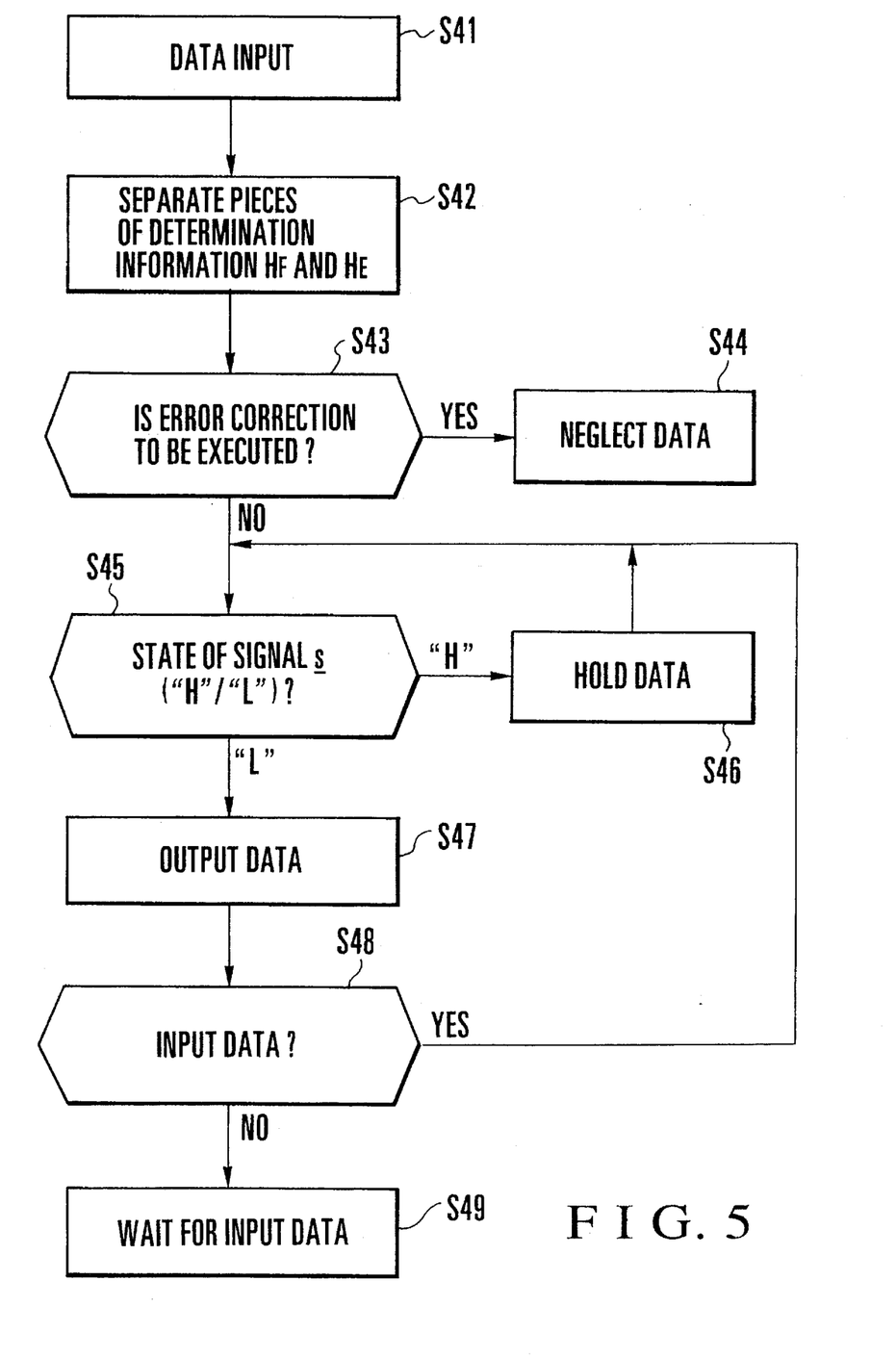
FIG. 5 is a flow chart showing an operation sequence in a variable delay circuit in FIG. 1.

FIG. 5 shows the above processing performed by the variable delay circuit 14. When data is input in step S41, the pieces of information HF and HE are separated from each other (step S42). It is then checked from these pieces of determination information whether error correction should be executed (step S43). If one of the pieces of determination information HF and HE is at "H" level, error correction is performed. Therefore, in the variable delay circuit 14, this input data is neglected (step S44).

If it is determined in step S43 that both the pieces of determination information HF and HE are at "L" level, and error-correcting coding should not be performed, the state of the signal s representing a frame length is checked (step S45). While this signal s is at "H" level, the input data is held in a buffer or the like (step S46), and is kept held until the signal s is set at "L" level, thereby properly controlling the delay time T in FIG. 4E.

When the signal s set at "L" level, the held data is output from the variable delay circuit 14 (step S47), and the processing in steps S45 to S48 is repeated for the next input data. If there is no input data, the flow waits for input data (step S49).

Finally, a selector 15 selects and outputs the frame data b output from the error-correcting coding section 13 or the frame data c output from the variable delay circuit 14 on the basis of the signal s output from the error-correcting coding section 13 and representing the frame data interval in which error-correcting coding is executed, and transmits the data to the network side.

Referring to FIGS. 4C and 4D, when the signal s is set at "H" level, the selector 15 selects and outputs the output b from the error-correcting coding section 13. The frame data d in FIG. 4F which is output from the selector 15 is transmitted from the output terminal in FIG. 1 to the network side.

With the above processing, when it is determined, upon recognition of the state of the network, that error-correcting coding is not performed, as in the case of the frame data containing the data D3 and D5 in FIG. 4A, the data can be transmitted without transmitting any redundant bit while the delay is eliminated or minimized.

As has been described above, according to the present invention, the transmission section of the transmission apparatus recognizes the congestion state and the bit rate in the ATM network in the B-ISDN, and data can be transmitted without any decrease in transmission speed and efficiency which are caused by a delay due to error-correcting coding and redundant bits, while a cell loss in the network is prevented from affecting the contents of data to be transmitted and the service form using the data.

What is claimed is:

1. A data transmission apparatus comprising:

data coding means for coding input data and outputting the coded data;

determination means for determining execution/non-execution of error-correcting coding processing on the basis of a congestion state and a bit error generation state in a network in which data transmission is to be performed, and generating determination information representing the determination result;

frame formation means for multiplexing the determination information from said determination means with the coded data from said data coding means in units of frames, and generating frame data having a predetermined frame format;

error-correcting coding means for executing error-correcting coding processing for the coded data in units of frames in accordance with the determination information contained in the frame data from said frame formation means, and generating frame length information representing a frame length of a frame for which error-correcting coding processing is executed;

variable delay means for, when the determination information contained in the frame data from said frame formation means represents non-execution of error-correcting coding processing, delaying the frame data of the frame, for which error-correcting coding processing is not executed, by a frame length indicated by frame length information of an immediately preceding frame for which error-correcting coding processing is to be executed; and output means for outputting outputs from said error-correcting coding means and said variable delay means in a time-serial manner.

2. An apparatus according to claim 1, wherein the frame data has a variable length data format including n fixed-length cells (n is a natural number including 0).

3. An apparatus according to claim 2, wherein said error-correcting coding means comprises first means for performing anti-cell-loss error-correcting coding for frame data from said frame formation means, and generating frame information representing a frame length of a frame having undergone error-correcting coding, second means for performing anti-bit-error error-correcting coding for frame data from said frame formation means, and generating frame information representing a frame length of a frame having undergone error-correcting coding, and selection means for selecting and outputting outputs from said first and second means in accordance with determination information contained in frame data from said frame formation means.

4. An apparatus according to claim 3, wherein said determination means generates a determination signal as determination information indicating that anti-cell-loss error-correcting coding processing is to be executed by said first means, when the network is in a congestion state, and generates a determination signal as determination information indicating that anti-bit-error error-correcting coding processing is to be performed by said second means in accordance with a bit error generation state, when the network is not in a congestion state.

5. An apparatus according to claim 4, wherein said determination means generates a determination signal indicating that anti-bit-error error-correcting coding processing is to be executed by said second means, only when a rate of occurrence of bit errors in the network is not less than a predetermined rate.

6. An apparatus according to claim 1, wherein said variable delay means outputs frame data from said frame formation means without any delay, when the determination information contained in the frame data from said frame formation means represents non-execution of error-correcting coding processing, and error-correcting coding processing is not executed for an immediately preceding frame and an interval in which no coded data is present continues immediately before the frame.

7. A data transmission apparatus comprising:

data coding means for coding input data and outputting the coded data;

determination means for determining execution/non-execution of error-correcting coding processing on the basis of a congestion state and a bit error generation state in an asynchronous transfer mode network in which data transmission is to be performed, and generating determination information representing the determination result;

frame formation means for multiplexing the determination information from said determination means with the coded data from said data coding means in units of frames, and generating variable-length frame data having a predetermined frame format;

first error-correcting coding means for performing anti-cell-loss error-correcting coding for frame data from said frame formation means, and generating frame information representing a frame length of a frame having undergone error-correcting coding;

second error-correcting coding means for performing anti-bit-error error-correcting coding for frame data from said frame formation means, and generating frame information representing a frame length of a frame having undergone error-correcting coding;

selection means for selecting and outputting outputs from said first and second error-correcting coding means in accordance with determination information contained in frame data from said frame formation means;

variable delay means for, when the determination information contained in the frame data from said frame formation means represents non-execution of error-correcting coding processing, delaying the frame data of the frame, for which error-correcting coding processing is not executed, by a frame length indicated by frame length information of an immediately preceding frame for which error-correcting coding processing is to be executed; and output means for outputting outputs from said error-correcting coding means and said variable delay means in a time-serial manner, wherein said determination means generates a determination signal as determination information indicating that anti-cell-loss error-correcting coding processing is to be executed by said first error-correcting coding means, when the network is in a congestion state, and generates a determination signal as determination information indicating that anti-bit-error error-correcting coding processing is to be performed by said second error-correcting coding means in accordance with a bit error generation state, when the network is not in a congestion state.

8. An apparatus according to claim 7, wherein said determination means generates a determination signal indicating that anti-bit-error error-correcting coding processing is to be executed by said second error-correcting coding means, only when a rate of occurrence of bit errors in the network is not less than a predetermined rate.

* * * * *